United States Patent [19]

Balch

[11] Patent Number: 5,228,804
[45] Date of Patent: Jul. 20, 1993

[54] METHOD AND APPARATUS FOR HYDROCARBON-CONTAMINATED SOIL REMEDIATION

[76] Inventor: Thomas H. Balch, 174 Nelson Rd., Scotts Valley, Calif. 95066

[21] Appl. No.: 904,387

[22] Filed: Jun. 25, 1992

[51] Int. Cl.⁵ ............................................. B09B 1/00
[52] U.S. Cl. .................................. 405/128; 405/131; 405/263
[58] Field of Search ................ 405/128, 263, 131, 37, 405/43, 44, 51

[56] References Cited

U.S. PATENT DOCUMENTS

| | | |
|---|---|---|
| 4,745,850 | 5/1988 | Bastian et al. |
| 4,842,448 | 6/1989 | Koerner et al. |
| 4,849,360 | 7/1989 | Norris et al. |
| 4,867,604 | 9/1989 | Bell |
| 4,982,788 | 1/1991 | Donnelly |
| 5,011,329 | 4/1991 | Nelson et al. ............. 405/131 X |
| 5,035,537 | 7/1991 | Rose |
| 5,076,727 | 12/1991 | Johnson et al. ............. 405/131 X |
| 5,088,856 | 2/1992 | Yocum ......................... 405/128 |
| 5,114,497 | 5/1992 | Johnson et al. ............. 405/128 X |
| 5,116,163 | 5/1992 | Bernhardt .................... 405/128 |
| 5,120,160 | 6/1992 | Schwengel ................... 405/128 |
| 5,127,768 | 7/1992 | Crawshaw et al. ............ 405/128 X |

OTHER PUBLICATIONS

Aki Systems, Inc., Vapor Destruction Systems Brochure (4 pages) Mobile Vapor Incinerator (on p. 3), date unknown.
Larry Spears, Machine Deodorizers burns away toxic wastes, Contra Costa Times, pp. 1 & 13A, Wednesday, Jul. 31, 1991.

Primary Examiner—Dennis L. Taylor
Assistant Examiner—J. Russell McBee
Attorney, Agent, or Firm—Jacques M. Dulin

[57] ABSTRACT

A method and apparatus for ex situ remediation of hydrocarbon-contaminated soil, comprising the excavation of the soil from its in situ position and forming a covered pile of loosened soil, at the base of which an array of a plurality of hot air inlet conduits are located. At least one array of a plurality of gas take-off conduits are situated at one or more higher level(s) in the pile. Heated air is injected into the inlet conduits at the base of the pile and allowed to percolate up through the soil to remove the hydrocarbons and volatile organic compounds as hydrocarbon vapor entrained process gas. This process gas is drawn off by applying a negative pressure to the take-off conduits. The drawn-off process gases are then passed through a gas burner which thermally oxidizes the hydrocarbons and organic compounds. The heat generated from the gas burner is exchanged with ambient inlet air to provide the hot air used to inject into the base soil pile. Several layers of inlet and/or exhaust conduit arrays may be provided. The oxygen content and temperature of the exhaust gas is measured downstream of the burner. Auxiliary air is supplied to the burner when the $O_2$ content drops below about 12% and the auxiliary fuel supplied when the temperature falls below about 1400° F. The covering traps heat and prevents air dilution.

18 Claims, 2 Drawing Sheets

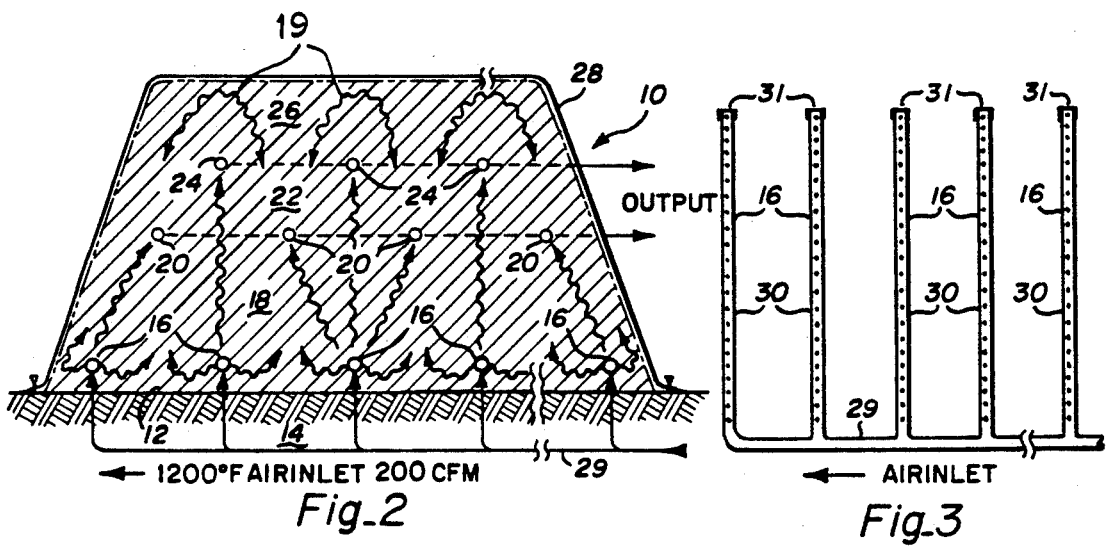
Fig_2   Fig_3
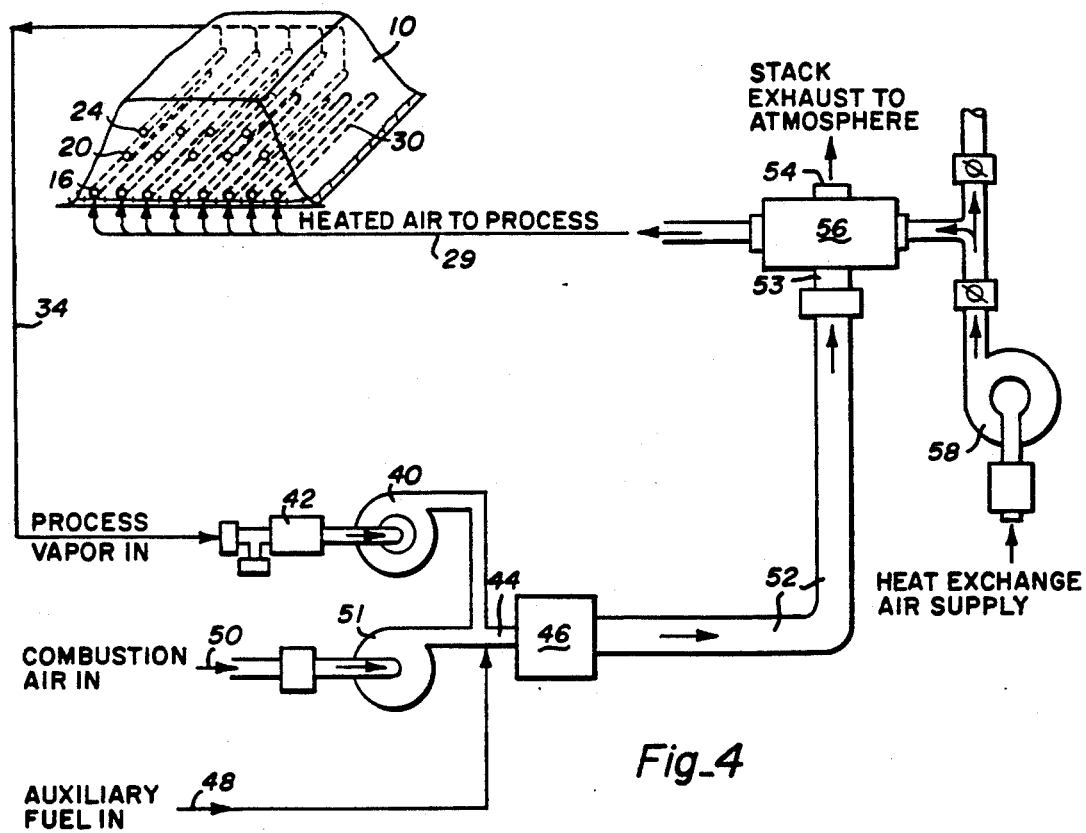
Fig_4

METHOD AND APPARATUS FOR HYDROCARBON-CONTAMINATED SOIL REMEDIATION

FIELD

The present invention relates to a method and apparatus for removing hydrocarbon contaminants from contaminated soil, and more particularly, to a system and process for removal of hydrocarbon contaminants by the injection of heated air into an ex situ body of such contaminated soil to vaporize the hydrocarbons, followed by collecting the gases after having passed through the mass of soil, passing the collected gases containing vaporized hydrocarbons into a flame zone to fully oxidize the hydrocarbons, and then recovering the heat value of the burned hydrocarbons by heat exchange with the inlet air.

BACKGROUND

In the present-day environmentally conscious world it is becoming increasingly important to ensure that polluting contaminants are not spilled onto or leaked into the soil. Apart from such contamination having a detrimental effect on any life directly supported by such contaminated soil, the very real danger exists that such contaminants leach from the contaminated soil into the water table or are washed into rivers or water storage areas, with further detrimental effects.

Unfortunately, the need for maintaining a contaminant-free soil has only been considered a priority in recent years. As a result, a large number of sites exist, both nationally and internationally, where the soil has been contaminated extensively with pollutants such as chemicals, hydrocarbons and/or other volatile organic pollutants. Furthermore, even with the best storage and transportation facilities available, pollution of soil still occurs during unintentional and accidental leakage and spillage of pollutants. Accordingly, there is a pressing need for a cost-effective method of removing pollutants.

A variety of approaches have been tried for removal of hydrocarbons, among them use of microbes (bioremediation), leaching, displacement aeration, and in situ forced air or induced air (evacuation) processes.

U.S. Pat. No. 5,035,537 of Rose shows a leaching process for removing contaminants from a layer of soil which is spread in a thin layer on an impervious base by treating the layer with an emulsification agent sprayed thereon which seeps down through the layer and is collected at the base. If any gases result from the leaching process, these are collected by a tent supported above the layer on stakes, and vented through an open flame burner which exhausts to atmosphere.

U.S. Pat. No. 5,011,329 of Nelson, et al. shows an in situ soil decontamination process in which hot gas is forced into cased boreholes drilled into or below a contaminated zone. The hot gas is forced up from the bottom of the borehole up through the in situ soil and is trapped and collected in a system of trenches emplaced under a gas impervious sheet on the surface of the soil. Contaminants entrained in the collected gas are burnt off in a burner which heats the gas that is forced into the boreholes.

U.S. Pat. No. 4,982,788 of Donnelly is another in situ process of drilling a plurality of boreholes into contaminated soil. Heated air is forced into a first set of wells to percolate laterally from the bottom of the wells to a second set of exhaust wells. Extrained contaminants are condensed above ground.

U.S. Pat. No. 4,867,064 of Bell shows a system for monitoring toxic waste leachate in a landfill comprising a plurality of interconnected, horizontally laid, perforated PVC or ABS collector pipes and a plurality of vertically oriented monitoring pipes in communication with the collector pipes. Levels and concentrations of toxic waste can be monitored at different points via the monitoring pipes. The pipe network is laid down before the fill is deposited.

U.S. Pat. No. 4,849,360 of Norris et al. shows a process of aerobically biodegrading contaminants in a mass of particulate solids in a sealed container. Gas containing oxygen is pumped into the container mass through at least two different levels of gas inlet conduits, with the correct oxygen content being maintained in the mass to sustain biodegrading micro-organisms to which a microbial nutrient (Restore 375) is added. The sealed container can be an excavation or pit lined with an impermeable liner.

U.S. Pat. No. 4,745,850 of Bastian et al. shows a wind-driven suction-type venting system for driving air through permeable conduits in contaminated soil. Contaminants flow into the conduits under action of gravity and are vented to atmosphere with the air driven through the conduits.

U.S. Pat. No. 4,842,448 of Koerner et al. is directed to an in situ vacuum method of removing organic solvents and hydrocarbons from the soil. To enhance the vacuum removal of contaminants, a liberating fluid such as heated air or steam may be pumped into the soil via angled conduits extending into the soil below the projected area of contamination.

The above-described in situ forced air and suction methods have the disadvantage that a substantial vacuum suction or forced air pressure is required to draw or force the contaminants and any liberating fluid that may be used out of the soil. This is because the soil mass is in situ. As a result of natural compaction of in situ soil, the spaces between the various particles of the soil are very small. Furthermore it is extremely difficult, with this method, to isolate the surface of the body of the soil which is exposed to atmosphere so that it is sealed well enough to have an efficient suction that does not draw air from the atmosphere or let forced air escape.

The present invention overcomes these disadvantages by removing the soil from its in situ position, thereby causing it to loosen with resultant larger voids between the soil particles for more efficient and more complete removal of hydrocarbons. In addition, this invention provides for a positive pressure combined with a negative pressure to enhance the removal of the contaminants from the soil.

THE INVENTION

Objects

It is among the objects of this invention to provide an improved system apparatus and method for soil remediation, particularly the thermal removal of hydrocarbons from contaminated soil.

In another object of this invention to provide an ex situ method of remediation of soil by excavating the soil to loosen it for improved air flow, and to permit the construction of a special treatment pile having emplaced therein conduits for inlet hot air and exhaust gases conduits placed intermediate throughout the pile in a spaced array that insures thorough internal aeration, heating and vapor extraction of heat-volatilized hydrocarbons.

It is another object of this invention to provide a system apparatus which employs a fossil fuel burner for heating incoming ambient air which is then supplied to the soil pile as inlet hot air, and feeds the entire stream of exhaust gases back to the burner as primary or secondary air to ensure the thermal oxidation of the extracted hydrocarbons and recover their heat value.

It is another object of this invention to provide a control system for a soil remediation heating and thermal oxidation unit which ensures that the hydrocarbon vapors present in exhaust gases are completely oxidized and heat values are efficiently recovered.

It is another object of this invention to provide a method for soil remediation which is simple, highly efficient, and ensures that the entire area of contamination is treated with certifiable certainty.

It is another object of this invention to provide a method and system for remediation of soil contaminated with hydrocarbons which does not have the disadvantages of in situ thermal remediation techniques.

Still other objects will be evident from the specification, claims and drawings.

Summary

The invention is directed to a method and apparatus system for removal of contaminants, such as hydrocarbons and other volatile organic compounds from soil, comprising excavating soil from its in situ position, and forming an organized pile of the soil with a vapor impermeable cover over the exposed top of the pile. A plurality of gas inlet conduits are located in the base of the pile. At higher levels in the pile a plurality of gas take-off conduits are situated. Heated gas is injected into the inlet conduits and allowed to percolate up through the loosened soil to vaporize and remove, as part of the exhaust gas, the hydrocarbons and volatile organic compounds. The exhaust gas is drawn off by applying a negative pressure to the take-off conduits. The exhaust gases are then passed through a gas burner which thermally completely oxidizes the hydrocarbons and organic compounds. The exhaust gases containing hydrocarbon vapors are preferably used as secondary air to the burner, but may be used as primary air, or both. The heat generated from the gas burner is used to heat ambient air via a heat exchanger. The resulting hot ambient air is injected into the soil at the base of the pile.

This invention is also directed to the system apparatus by which the method of the invention may be carried out. For the purposes of this specification the word "soil" should be taken to include any one of, or any combination of, the various soil types as well as porous rocks, sand and the like.

An important aspect of this invention is that the process permits a high degree of certainty that the hydrocarbons of a contaiminated soil area have, in fact, been removed to the appropriate levels required by regulation, or as required by the usage for the remediated soil. The first step is to assay the soil in the area where contamination is suspected and to identify a "profile" of the contamination in terms of the hydrocarbon content of the soil. This profile can be a two-dimensional, plan view profile or vertical elevation down through the soil. These diagrams can also be referred-to as contour plots. In the alternative, the profile can be a three-dimensional profile or contour representation showing the entire volume which must be excavated for treatment.

Typically, the excavation is done by standard excavation or mining techniques. Where there is an extensive area to be treated, the entire region to be treated can be laid out in appropriate rows or a grid, so that the soil from a first area to be treated is placed onto an area which subsequently must be treated, and treated there in accordance with the invention. After treatment, the soil is re-emplaced back into the original excavation. Then the adjacent region is excavated and placed on top of the originally excavated treated soil area or a subsequent area to be treated. That is treated and thereafter placed back into its pit. The process is repeated until the entire area is treated (remediated).

After a particular soil volume (region) is originally excavated and treated, the pit itself is tested for evidences of hydrocarbons before re-emplacement of remediated or fresh clean soil. Thus, the walls and bottom of the excavation pit can be assayed for any additional hydrocarbon contamination. Any additional excavation for treatment which is required may be done at that time until the walls and floor assay is clean. Then the pile of loosened soil is treated by the method of this invention. The remediated soil is then assayed by appropriate techniques, e.g., by use of selected grab samples throughout the pile. When the assays show the pile is completely remediated, then the remediated soil is placed back into the pit, disposed in approved landfill, or used elsewhere.

At that point the site owner and the remediation contractor employing the method of this invention are assured that the site excavation is completely remediated, and likewise that the re-emplaced soil is fully remediated. Then, if any hydrocarbon contamination is subsequently found on the site, it is clear that the contamination occurred subsequent to the remediation treatment. If the property has transferred ownership in the meantime, then the liability of the original owner is essentially terminated. Likewise, the liability of the remediation contractor is reduced or eliminated because there is positive assessment of both the pit and the soil that has been treated.

The pile configuration is important for the air flows given as typical examples in this application. A pile may be on the order of 100 feet in lateral depth (length), but may be any width. The depth of the pile is shown by the letter D in FIG. 1. Since additional pipes can be added across the width of the pile (W in FIG. 1) in an extended manifold, the width of the pile may be any selected width, depending on the volume of the pile that results from the excavation from the site. The typically preferred height of the pile (H in FIG. 1) is on the order of 14 feet. But higher piles may be processed by using larger or a greater number of inlet pipes with greater total flow and larger burners, and larger or a greater number of exhaust gases piping.

Importantly the removal of the hydrocarbon vapors via the exhaust gases occurs internal to the pile, rather than requiring the heated inlet air to be forced throughout the entire soil pile mass and out a top surface only. This internal removal of the exhaust gases with entrained hydrocarbons prevents reabsorption of the hydrocarbons in the upper reaches of the pile. This is important because in many hydrocarbon contaminated sites, there is a variety of hydrocarbons, some of which may more readily be reabsorbed than others, or which may act as solvents for other hydrocarbons. Thus, oil absorbs gasoline.

It should also be noted that the ex situ pile is now in the inverse sequence of its normal, compacted, in situ position. In the usual hydrocarbon spill, the heavier hydrocarbons tend to gravitate into the lower reaches of the soil and lighter hydrocarbons gradually rise to the surface to evaporate therefrom. Thus, when the pile is turned upside down, by the excavation to form the structured, loosened, soil pile of this invention, the now-ascending vapors can be reabsorbed by the heavier hydrocarbons or soil. Thus, by taking off the heated air-entrained hydrocarbons internally in the pile, this reabsorption effect is reduced.

Further, in order to obtain a given level of hydrocarbon removal, internal removal results in a significantly shorter time to remove the hydrocarbons, because it is not necessary to get the entire pile completely up to one temperature before any hydrocarbon can be percolate out and be removed. Rather, the removal starts relatively immediately, as the heated air needs only contact the loose particles adjacent the inlet pipes in the pile and then migrate through the relatively open channels of the loosened soil to the exhaust piping. It is not necessary to heat the entire pile before removal commences.

This effect is enhanced by the fact that the soil in the pile is loose and provides good air flow throughout the pile. In contract, in in situ situations, where the soil is in its normally compacted condition, the hydrocarbon removal occurs more by the heating of the entire soil mass in place before the remediation is fully effective. In contrast, in the process and system of this invention, the heated air can circulate with more efficient removal of hydrocarbons and heat transfer to the soil.

The tarping (covering) of the pile serves at least three vital functions: First, it insures no dilution of the process air by external ambient air both as to volume and as to temperature which would be reduced by influx of ambient air. This permits precise control of process air, with a balance of inlet hot air and the exhaust proces air. Second, the tarp can act as a solar energy sink, adding vital heat from the top of the pile where the hydrocarbons may be most concentrated because of the inversion of the soil during construction of the pile. This tends to drive the hydrocarbons to the exhaust piping. Third, the tarp prevents rain or snow from entering the pile, which would result in both cooling the pile, reducing efficiency, and a contaminated water run-off pollution problem.

Whereas conventional aeration releases untreated hydrocarbons to the atmosphere (in short trading air pollution for soil pollution), the process of this invention eliminates that air pollution and releases only complete combustion products, principally $CO_2$ and $H_2O$, to the atmosphere.

BRIEF DESCRIPTION OF THE DRAWINGS

The invention is illustrated by reference to the accompanying drawings, in which:

FIG. 2 is a cross section through a pile of soil undergoing remediation by the process of this invention;

FIG. 3 is a plan view of a plurality of gas inlet conduits; and

FIG. 4 is a schematic representation of the apparatus system for thermally oxidizing the contaminants drawn from the pile in FIGS. 1 and 2 with recycle of heat from the burned hydrocarbons in the exhaust gases.

DETAILED DESCRIPTION OF THE BEST MODE

Figure 1:
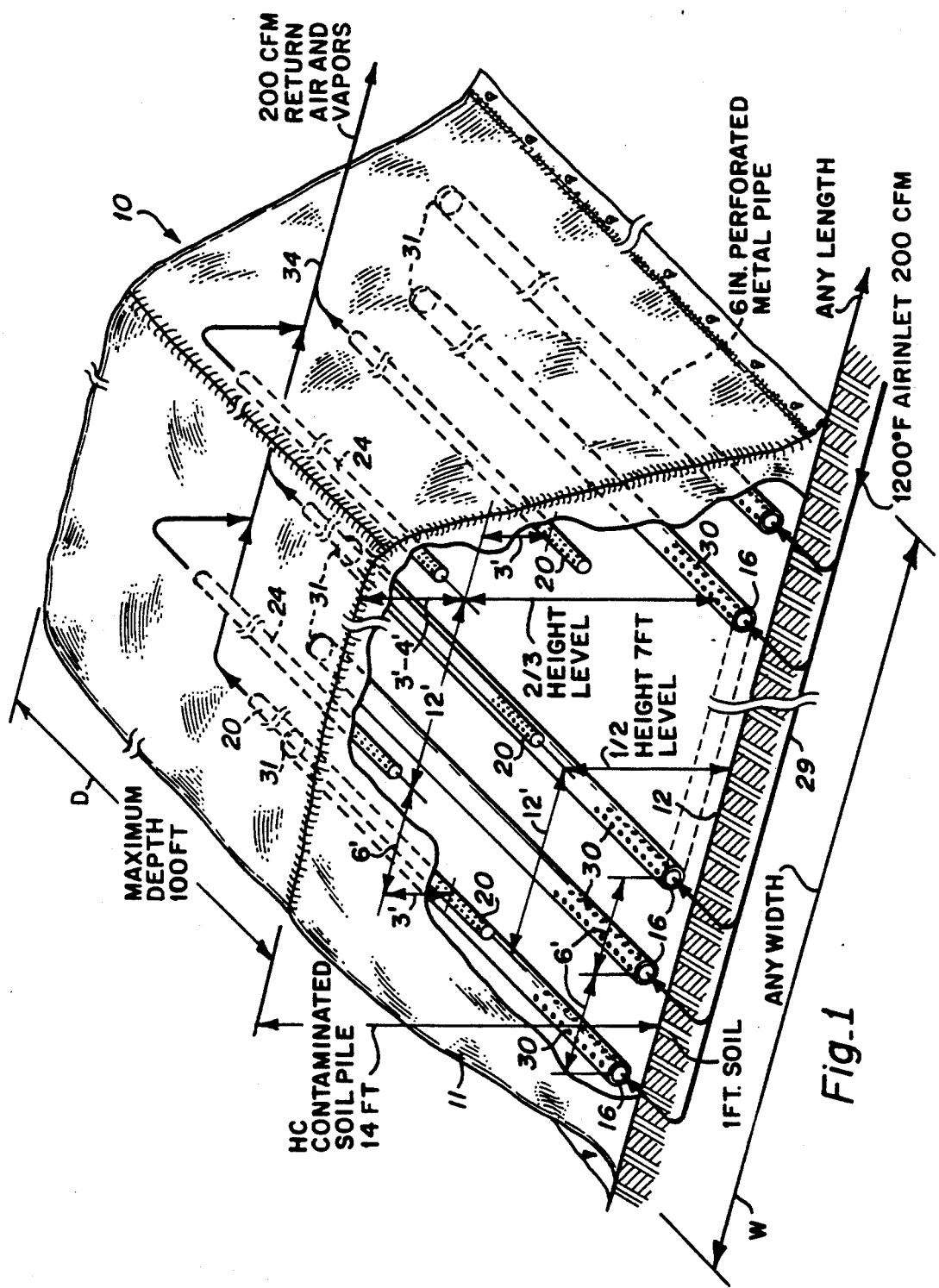
FIG. 1 is an isometric view through a pile of contaminated soil with one end broken away to show the piping layout.

The following detailed description illustrates the invention by way of example, not by way of limitation of the principles of the invention. This description will clearly enable one skilled in the art to make and use the invention, and describes several embodiments, adaptations, variations, alternatives and uses of the invention, including what I presently believe is the best mode of carrying out the invention.

In FIGS. 1 and 2 a mound or pile of excavated contaminated soil is generally indicated as 10 and is constructed as follows. First, a base layer 12 of excavated soil is formed on a generally flat support area 14. The base layer is typically a foot thick but may range from a few inches to about 3 feet, the thicker being for looser soil or clean topmost soil from an area having only subterranean contamination and little or no surface contamination. The base of the mound could be any suitable width (W in FIG. 1) but the mound is typically no more than 100 feet (30,5 meters) in depth (length, D in FIG. 1) The reason for this limitation will be discussed below. The support area 14 may be in situ soil. It need not be, but may be, a special surface such as concrete, asphalt or some barrier placed on the ground such as heavy plastic sheeting, landfill barrier or the like.

Thereafter, a layer of gas inlet conduits 16 are laid on top of layer 12 to form a series of parallel conduits. The arrangement of these conduits is illustrated in FIGS. 1 and 2. Each conduit 16 is preferably a 6 inch (152 mm) diameter pipe which has perforations 30 throughout its length to allow gas (heated air) to flow out and into the surrounding loosened soil. Each conduit 16 is capped at one end 31. The array of conduits are linked together by a manifold 29 at the opposite end which connects to a heated air supply (see FIGS. 3 & 4). The heated air supply will be described in more detail below with reference to FIG. 4.

Returning now to FIG. 2, once the inlet air conduits 16 have been laid, a secondary layer of contaminated soil 18 is placed on 14 top of the first layer of soil 12. Typically this secondary layer is in the order of between from about 6 to about 7 feet (1830 mm to 2130 mm) thick, but may range from about 2 feet to 10 feet in thickness.

On top of the secondary layer 18 a first layer of exhaust gas take-off conduits 20 are placed. These conduits 20 are typically 2 inch (51 mm) diameter perforated pipes capped at one end, with 12 foot (3660 mm) center-to-center spacing. They are joined together at their opposite ends by a manifold (see FIGS. 1 & 4) to form parallel lines of pipes along the depth (length) of the mound 10 in a configuration similar to that illustrated for the inlet pipes 16. The outlet manifold is conveniently placed at either the same end as the supply air manifold, or at the opposite end of the pile. A tertiary layer 22 of soil is then placed on top of the first array of exhaust conduits 20. This layer is typically 3 to 4 feet (915 mm to 1220 mm) thick, but may range from 1 foot to 6 feet in thickness. On top of this tertiary layer of loosened soil 22 a second array of exhaust gases take-off conduits 24 is laid. These conduits 24 are preferably 2 inch (51 mm) diameter pipes laid at 12 foot (3660 mm) center-to-center spacing. These conduits are staggered or offset with respect to the first set. That is they are placed parallel to the conduits in the first array of take-off conduits 20, but are arranged such that each conduit 24 lies midway between and above two corresponding conduits in the first layer of off-take conduits 20 (see FIG. 2). The conduits 20 and 24 are typically PVC schedule 20 or 40 plastic pipe.

A final layer of soil 26 is placed on top of the second layer of exhaust gas off-take conduits 24. This layer is on the order of 4–5 feet in thickness but may range from 2–8 feet thick. Thereafter the entire mound 10 is covered by a vapor impervious plastic sheet 28, or overlapped strip sheeting. Typically this sheet would be on the order of between 6 to 10 millimeters in thickness. The spacing of the piping can be reduced for denser soil, or additional arrays of inlet hot air and recovery exhaust (process) gas piping may be employed in the same height pile, or used to increase the effective height of the pile. While FIG. 2 shows the pile schematically as trapezoidal, the top may be crowned. The typical total height of the pile (H in FIG. 1) is on the order of 14 feet, but may range from about 8–10 feet to over 20 feet, the former by not emplacing the top layer of pipes 24 and the latter by adding one or more additional layers of pipes 24 above the layer shown in FIG. 2. That is, there may be plural layers of inlet and exhaust pipes in the same pile.

The configuration of the pile is important in that the exhaust piping is internal and the upper pipes are staggered internally. Note also that there is a solar effect where the plastic or rubber sheeting 10 is black. This causes heating from the exterior driving evaporated hydrocarbons (arrows 19 in FIG. 2) to the exhaust ducts 20 and 24. Also, having the exhaust ducts internal of the loose soil pile tends to reduce ballooning of the coversheet 28 with attendant loss of exhaust gases around edges or at overlaps. If necessary, a few exhaust ducts can be placed between the soil pile outer surface and the inner surface of the cover 28.

In operation the method of the invention works as follows. Heated air at between 1200° to 1400° F. (650° to 750° C.) is pumped under pressure via inlet manifold 29 into the gas inlet conduits 16 and out the holes 30 formed in the conduit. See FIG. 3. This air then percolates up through the layers of soil above the conduits. At the same time, a negative pressure is applied across the exhaust manifolds 34 connecting both sets of take-off conduits 20, 24.

This negative pressure enhances the percolation of the hot gas as the air is both forced and sucked through the soil. As the air moves through the soil it entrains the contaminating hydrocarbons and volatile organic compounds in the soil. The entrained hydrocarbon-containing process gases are then at least partially removed via the first layer of take-off conduits 20. The process gases are routed to the oxidation unit illustrated in FIG. 4, the operation of which is described below.

Some of the heated air is not sucked into the first layer of take off conduits 20, but continues to pass up through the layer of soil 22 located between the first layer of take-off conduits 20 and the second layer of take-off conduits 24. This heated air entrains further hydrocarbons and volatile organic compounds and is at least partially sucked into the second layer of take-off conduits 24.

Still other air moves past this second layer of take-off conduits 24 and passes into the uppermost layer 26 of soil. This air, however, is prevented from escaping to atmosphere because of the plastic sheet 28 covering the mound 10. As a result of the combined suction at both sets of take-off conduits 20, 24 a negative pressure is created under the plastic sheet 28. This has the effect that all air injected into the mound at inlet conduits 16 is eventually removed from the mound, together with the entrained contaminants via the take off conduits 20 and 24, and manifold 34. Note that where the plastic sheeting 28 is black, the solar radiation trapped thereby helps volatilize the hydrocarbons, at least in the upper soil layer 20.

The reason why the various conduits, and therefore the mound preferably does not exceed 100 feet (30,5 meters) in depth, D, is because lengths greater than this require a substantial amount of pressure which is expensive to generate and makes this method less economically viable. Of course, where large soil deposits are contaminated, the piles may be larger (longer and/or deeper) as air handling economics permit.

The heated air supply, and the drawn off process gases are further processed by the apparatus illustrated in FIG. 4. The process air containing entrained hydrocarbons and organic compounds is sucked from take-off conduits 20, 24 via manifold 34 into and by means of a vacuum blower (induced draft fan) 40. A filter 42 is located on the inlet side of the blower 40 to filter out any large particulates which may be detrimental to the operation of the process, e.g. dirt, dust, sand etc.

The process air is then fed from the vacuum blower 40 into a burner 44 and from there into a combustion chamber 46 where the hydrocarbons and other organic compounds are thermally oxidized. Although the hydrocarbons and/or volatile organic compounds may, in themselves, be combustible, their concentration in the air stream may not be great enough to sustain the thermal oxidation process. Provision is therefore made for the addition of auxiliary fuel to the burner from a remote location, at 48, as well as additional combustion air at 50, as need be, to maintain the proper combustion and oxygen content to completely oxidize the entrained hydrocarbons.

The heated air exiting the combustion chamber, at a temperature of approximately 1400° F. (760° C.) flows along a conduit 52 to be exhausted to atmosphere via exhaust stack 54. Before this air exhausts to atmosphere it passes through a heat exchanger 56 which heats the inlet pressurized air which is supplied by a blower 58 to the manifold 29 of the inlet conduits 16 illustrated in FIGS. 1 and 2. None of these contaminants are recycled into the mound 10 by injection from the inlet conduits 16. The heat values of the recovered hydrocarbon vapors and/or auxiliary fuel are used to efficiently heat the inlet process air.

During the above process various parameters of the exhausted air are measured at or close to the stack 54 and the inlet side 53 of the heat exchanger 56. If the temperature at the inlet 53 drops below 1400° F. (760° C.), additional burner fuel 45 is supplied. This is to ensure both adequate thermal oxidation of the contaminants as well as adequate heating of the air to be injected into the pile of soil being treated. Similarly, if the oxygen content of the exhausted gas at stack outlet 54 drops below 12%, additional combustion air 50 is fed into the burner via blower 51. This second parameter is important to ensure that all the contaminants are fully thermally oxidized. It is, of course, not always necessary for either auxiliary fuel or additional combustion air to be supplied at the burner 44, but the monitoring and controls described above are required for proper operation to insure clean exhaust at stack 54.

The method and apparatus of this invention have been tested on a variety of soil types, ranging from clayey loam with high water content due to winter rain, to slightly moist silty dirt, to moist, lumpy, clayey soil. The initial hydrocarbon content is typically in the range of from about 200 to more than about 10,000 ppm total petroleum hydrocarbons (TPH) as gasoline (using EPA method 5030 in conjunction with modified 8015), and benzene, toluene, xylenes and ethylbenzene (BTX&E using EPA method 8020). As described below in the Comparative Example, after failing open aeration for 39 days, the process of this invention was applied to from 1000 cubic yard to a 2200 cubic yard-sized pile for approximately 10 days, which resulted in non-detectable hydrocarbon concentrations at the exhaust outlet (at point 54 in FIG. 4).

COMPARATIVE EXAMPLE

A. Conventional Open Aeration

Soil samples from 3 separate excavations from 1,200 cubic yards of soil excavated from a fuel tank pit and pump islands area of a former gas station that was required to be remediated were sampled. Each composite sample consisted of four individual grab samples taken at various locations and at depths of approximately 2 feet with a sample frequency of one composite for every 50 cubic yards of soil. The samples were collected in 2 inch diameter, clean brass tubes, which were then sealed with aluminum foil, plastic caps and tape, and placed in a cooled ice chest for subsequent delivery to a certified laboratory for analysis. The table below shows the results of analysis.

The soil samples were analyzed to determine concentrations of total petroleum hydrocarbons (TPH) and gasoline using EPA method 5030 in conjunction with modified 8015, benzene, toluene, xylenes and ethylbenzene (BTX&E) using EPA method 8020. Table 1 below shows the results of 2 stages of conventional open aeration of the seven different samples throughout different locations in the stockpiled soil.

TABLE I

TPH (as gasoline) in Excavated Stockpiled Soil, in ppm*
Before and After Open Aeration

| Preaeration | | Aeration, Duration, Days | | |
|---|---|---|---|---|
| Sample | ppm | 23 Days, ppm | 38 Days, ppm | 39 Days, ppm |
| K | 440 | 150 | NT | 38 |
| L | 540 | 240 | NT | 38 |
| M | 160 | 97 | NT | NT |
| H | 110 | NT | 1.7 | NT |
| O | 270 | NT | 14.0 | NT |
| P | 480 | NT | 20.0 | NT |
| Q | 440 | NT | 1.9 | NT |

*Detection limits 1.0 ppm TPH
NT = Not Tested TABLE 1

The laboratory test results of soil samples initially taken from the excavated stock-piled soil (pre-aeration) from the fuel tank pit indicate levels of TPH as gasoline ranging from 110 parts per million (ppm) to 540 ppm, samples K,L,M,H,O,P,Q.

After the first open aeration (23-days duration), the soil was resampled in the area of the original samples K, L and M, and the analytic results of these soil samples show that after 23 days of aeration, the concentrations dropped only to a range of from 97 to 240 parts per million. After another 16 more days of aeration, 39 in total, in two samples of the three, the TPH assayed 38 parts per million. In another 4 samples (H,O,P and Q), the original concentrations ranged from 110 to 480 parts per million. After 38 days of aeration the same samples assayed from 1.7 to 20 parts per million.

Subsequently, an additional 1200 cubic yards of stockpiled soil that had been excavated from a fuel tank pit and a pump island area were assayed. The composite soil samples were the same methodology as above except the sample frequency was changed to one composite sample per every 200 cubic yards. The assays from these non-aerated soil samples range from a low of 520 to a high of 1300 parts per million TPH as gasoline, and two of them also included diesel concentrations ranging from 46 to 90 parts per million. Of all of the samples described above, the BTX&E assays range from ND (non-detectible) to 20 parts per million benzene, 42 part per million xylenes and 17 parts per million ethylbenzenes.

As a result of aeration, a portion (850 cubic yards) was disposed at a Class III disposal site (a landfill). However it was recommended that prior to loading and off-hauling the aerated stockpiled soil, when obvious isolated high contamination is detected within the stockpiled soil, that portion of the soil must be separately stockpiled for further aeration and sampling. Approximately 1400 cubic yards of the stockpiled soil, along with another 475 cubic yards of unsampled soil was required to remain on site for further treatment and sampling.

This conventional open aeration was considered to be a failure as the total time for excavation and aeration took over 40 days, and only a portion of the soil was sufficiently remediated as to be disposed in a Class III disposal landfill site. The soil was clearly not suitable for reimplacement on site.

B. Process of the Invention

Upon review of the above analytic results, the approximately 1875 cubic yards of soil that failed open aeration (including the 475 cubic yards of additionally excavated but non-aerated soil the TPH of which ranged from 520 to 1300 parts per million), that soil and an additional 325 cubic yards (total approximately 2200 cubic yards) were subjected to ex situ pile thermal treatment of this invention as described above.

The process in accord with this invention was operated for approximately 10 days continuously. After the remediation in accordance with this invention, the laboratory analysis as described above was carried out and the summary of the test results are shown in Table 2 below. The results are shown in parts per million unless otherwise indicated, and the term "ND" indicates non-detectable. Detection limits are 1.0 ppm TPH, and 0.0050 ppm for each of benzene, toluene, xylenes and ethylbenzene.

TABLE II

Remediation by the Invention Process
Ex Situ Covered Pile, Injected Hot Inlet Air,
Negative Pressure Exhaust

| Sample | TPH as Diesel | TPH as Gasoline | Benzene | Toluene | Xylenes | Ethylbenzene |
|---|---|---|---|---|---|---|
| Comp 10 | ND | ND | ND | 0.0075 | 0.030 | 0.0068 |
| Comp 11 | ND | 1.3 | ND | 0.0064 | 0.032 | 0.0071 |
| Comp 12 | 3.9 | 1.3 | ND | 0.0055 | 0.024 | 0.0090 |
| Comp 13 | 5.0 | 83 | ND | 0.095 | 0.56 | 0.078 |
| Comp 14 | ND | 49 | ND | 0.11 | 0.21 | 0.39 |

TABLE II-continued

Remediation by the Invention Process
Ex Situ Covered Pile, Injected Hot Inlet Air,
Negative Pressure Exhaust

| Sample | TPH as Diesel | TPH as Gasoline | Benzene | Toluene | Xylenes | Ethylbenzene |
|---|---|---|---|---|---|---|
| Comp 15 | 3.1 | 1.6 | ND | 0.0052 | 0.010 | ND |
| Comp 16 | ND | ND | ND | ND | ND | ND |
| Comp 17 | 1.8 | ND | ND | ND | ND | ND |
| Comp 18 | 3.5 | 52 | 0.16 | 0.13 | 0.34 | 0.058 |
| Comp 19 | 5.6 | 39 | 0.018 | 0.11 | 0.42 | 0.012 |
| Comp 20 | 3.2 | 1.4 | ND | 0.0057 | ND | ND |
| Comp 21 | 1.3 | ND | ND | ND | ND | ND |
| Comp 22 | 1.7 | ND | ND | ND | ND | ND |
| Comp 23 | 2.9 | ND | ND | ND | ND | ND |
| Comp 24 | 1.7 | ND | ND | ND | ND | ND |
| Comp 25 | 1.7 | 8.2 | 0.018 | 0.031 | 0.033 | 0.0061 |
| Comp 26 | ND | 2.3 | ND | ND | 0.0053 | ND |
| Comp 27 | 1.3 | 11 | ND | 0.035 | 0.085 | 0.015 |
| Comp 28 | ND | 16 | 0.039 | 0.036 | 0.15 | 0.026 |
| Comp 29 | 1.8 | 6.5 | 0.045 | 0.022 | 0.058 | 0.012 |
| Comp 30 | 2.7 | 13 | 0.054 | 0.041 | 0.10 | 0.016 |
| Comp 31 | 1.5 | 11 | ND | 0.026 | 0.12 | 0.019 |
| Comp 32 | 1.8 | 8.2 | 0.014 | 0.018 | 0.034 | ND |
| Comp 33 | 1.4 | 2.0 | ND | 0.0053 | 0.024 | 0.0056 |
| Comp 34 | 1.3 | ND | ND | ND | 0.0077 | ND |
| Comp 35 | ND | ND | ND | ND | ND | ND |
| Comp 36 | 3.2 | 22 | ND | 0.083 | 0.21 | 0.051 |
| Comp 37 | 1.7 | 2.0 | ND | ND | 0.022 | 0.0071 |
| Comp 38 | 2.1 | ND | ND | ND | 0.070 | ND |
| Comp 39 | 1.9 | ND | ND | ND | ND | ND |
| Comp 40 | ND | ND | ND | ND | ND | ND |
| Comp 41 | 1.8 | ND | ND | ND | ND | ND |
| Comp 42 | ND | 2.9 | 0.0060 | 0.013 | 0.014 | ND |
| Comp 43 | 1.2 | ND | ND | ND | ND | ND |
| Comp 44 | ND | 4.9 | 0.0061 | 0.0051 | 0.044 | 0.0091 |
| Comp 45 | ND | 4.6 | ND | 0.0069 | 0.042 | 0.013 |
| Comp 46 | ND | 3.2 | ND | 0.0089 | 0.024 | 0.010 |
| Comp 47 | ND | 2.5 | ND | 0.0067 | 0.021 | ND |
| Comp 48 | 1.1 | 6.2 | 0.016 | 0.024 | 0.033 | 0.0095 |
| Comp 49 | 1.3 | 11 | 0.030 | 0.13 | 0.13 | 0.066 |
| Comp 50 | 1.5 | 4.0 | ND | 0.012 | 0.010 | 0.018 |
| Comp 51 | 1.2 | ND | ND | ND | ND | ND |
| Comp 52 | 1.2 | 1.1 | ND | ND | 0.0058 | ND |
| Comp 53 | 3.2 | 5.4 | ND | 0.0091 | 0.032 | 0.015 |

The pre-treatment levels in this soil of TPH as gasoline ranged from 520 parts per million to 1300 parts per million, with diesel ranging from 46 to 90 parts per million. As a result of the ex situ pile remediation in accordance with this invention, the TPH as gasoline ranged from non-detectable to 83 parts per million, the diesel ranged from non-detectable to 5.6 ppm, and the BTX&E ranged from non-detectable to 0.39 ppm, with most assays that were detectable being in the parts per billion range. All of the soil could be disposed of in an approved Class III disposal site. The time to treat the soil was reduced from over 40 days to about 10 days, but shorter treatment periods are entirely feasible.

It should be understood that various modifications within the scope of this invention can be made by one of ordinary skill in the art without departing from the spirit thereof. I therefore wish my invention to be defined by the scope of the appended claims in view of the specification as broadly as the prior art will permit.

I claim:

1. A method of remediating hydrocarbon-contaminated soil comprising the steps of:
 a) excavating hydrocarbon-contaminated soil from its in-situ location;
 b) forming a loosened soil processing pile comprising:
  i) placing a first layer of the contaminated soil over a spaced array of perforated hot air injection pipes disposed at the base of said pile;
  ii) placing an array of perforated process gas removal pipes on said first layer of contaminated soil;
  iii) placing a second layer of soil over said process gas removal pipes;
  iv) covering said pile with a gases imperveous sheeting;
 c) injecting inlet hot air under pressure into the base of the pile of loosened soil via said injection pipes;
 d) maintaining said hot air injection for a time sufficient to permit percolation of hot air through said loosened soil pile to extract hydrocarbon contaminants as vapors therefrom to form hydrocarbon vapor-entrained process gases;
 e) removing hydrocarbon vapor-entrained process gases from said pile of loosened soil via said process gases removal pipes;
 f) thermally oxidizing the extracted hydrocarbon vapors present in said process gases to produce hot exhaust gases;
 g) exchanging heat from said exhaust gases to ambient air to produce said inlet hot air and cooled exhaust gases;
 h) exhausting said cooled exhaust gases to atmosphere substantially free of hydrocarbon vapor contaminants.

2. A method of soil remediation as in claim 1 wherein:
 a) the inlet hot air is heated to a temperature of at least 1000 degrees fahrenheit (538° C.).

3. A method of soil remediation as in claim 2 which includes the steps of:
 a) using fuel and oxygen during the process of thermal oxidation of the hydrocarbon contaminants.

4. A method of soil remediation as in claim 3 which includes the step of:
 a) monitoring the temperature and oxygen content of the exhaust gases downstream of the thermal oxidation step.

5. A method of soil remediation as in claim 4 wherein:
 a) fuel is added in the thermal oxidation step in response to the monitored temperature when the temperature of the gas leaving the thermal oxidation step falls below about 1400° F. (760° C.).

6. A method of soil remediation as in claim 5 wherein:
 a) air is added to the thermal oxidation step in response to the oxygen monitoring when the percentage of oxygen in the gas leaving the thermal oxidation step falls below about 12%.

7. A method of soil remediation as in claim 1 which includes the steps of:
 a) assaying the in-situ soil to determine the contamination levels in terms of THP and BTX&E;
 b) processing the loosened soil pile for a period of time sufficient to lower the THP and BTX&E to levels permitting disposal of soil in a Class III landfill site.

8. A method of soil remediation as in claim 7 wherein:
 a) said processing continues for a period of time sufficient to permit reemplacement of the soil as remediated soil in a site of choice.

9. A method of soil remediation as in claim 7 which includes the step of:
 a) assaying the walls and/or floor of the pit produced by excavating the in-situ soil to determine that substantially all of the contaminated soil has been excavated.

10. A method of remediating soil as in claim 9 which includes the step of:
   a) emplacing remediated or fresh soil in said pit; and
   b) certifying compliance with contamination remediation and use standards.

11. System apparatus for removing hydrocarbon contaminants from an ex situ pile of hydrocarbon-contaminated soil, comprising in operative combination:
   a) means for injecting hot inlet air throughout the base of the hydrocarbon-contaminated soil pile;
   b) means for extracting process gases containing vaporized hydrocarbon contaminants from the soil pile at a plurality of positions located at at least one level above the level of the means for injecting hot inlet air; and
   c) means for thermal oxidation of the process gases to oxidize recovered hydrocarbon vapor and produce hot exhaust gas; and
   d) means for covering said pile to prevent escape of hydrocarbon vapors.

12. System apparatus as in claim 11 wherein:
   a) the means for injecting hot air and extracting the process gases each comprise a plurality of elongate gas permeable conduits disposed in an array in said pile.

13. System apparatus as in claim 12 wherein:
   a) the conduits of each array are oriented parallel with one another.

14. System apparatus as in claim 13 wherein:
   a) the means for thermal oxidation of the process gases to remove the recovered hydrocarbon vapors comprises a burner for thermally oxidizing the contaminants.

15. System apparatus as in claim 14 which includes:
   a) a heat exchanger for transferring heat generated by the burner to the inlet air to provide the hot air injected into the soil pile.

16. System apparatus as in claim 15 wherein:
   a) said burner 15 includes means to add auxiliary fuel and air to the burner.

17. System apparatus as in claim 16 which includes:
   a) means for monitoring the temperature of the hot exhaust gas; and
   b) means for controlling supply of auxiliary fuel to said burner responsive to said temperature monitoring means to supply fuel to said burner when the temperature of the gas falls below about 1400° F. (760° C.).

18. System apparatus as in claim 17 which includes:
   a) means for monitoring the oxygen content of the exhaust gas; and
   b) means for controlling supply of air to said burner responsive to said oxygen monitoring means to add air to the burner when the oxygen content of the exhaust gas falls below about 12%.

* * * * *